US006670950B1

United States Patent
Chin et al.

(10) Patent No.: US 6,670,950 B1
(45) Date of Patent: Dec. 30, 2003

(54) PORTABLE COMPUTER AND METHOD USING AN AUXILLIARY LCD PANEL HAVING A TOUCH SCREEN AS A POINTING DEVICE

(75) Inventors: Dae-Je Chin, Seoul (KR); Du-Il Kim, Kyunggi-do (KR)

(73) Assignee: Samsung Electronics Co., Ltd., Suwon (KR)

(*) Notice: Subject to any disclaimer, the term of this patent is extended or adjusted under 35 U.S.C. 154(b) by 167 days.

(21) Appl. No.: 09/691,241

(22) Filed: Oct. 19, 2000

(30) Foreign Application Priority Data

Oct. 19, 1999 (KR) .......................................... 1999-45342

(51) Int. Cl.[7] .................................................. G09G 5/00
(52) U.S. Cl. .......................... 345/173; 345/1.1; 345/1.2; 345/1.3; 345/2.1; 345/2.2; 345/2.3; 345/112; 345/156; 345/211; 345/212; 345/213; 345/901; 345/903
(58) Field of Search ........................... 345/1.1, 1.2, 1.3, 345/173, 102, 156, 168, 901, 903, 211, 212, 213, 2.1, 2.2, 2.3; 361/168

(56) References Cited

U.S. PATENT DOCUMENTS

| | | | | |
|---|---|---|---|---|
| 4,846,694 A | | 7/1989 | Erhardt | |
| 5,307,055 A | * | 4/1994 | Baskin et al. | 345/1 |
| 5,633,660 A | | 5/1997 | Hansen et al. | |
| 5,637,871 A | | 6/1997 | Piety et al. | |
| 5,801,793 A | | 9/1998 | Faris et al. | |
| 5,828,427 A | | 10/1998 | Faris | |
| 5,837,968 A | | 11/1998 | Rohrberg et al. | |
| 5,847,698 A | * | 12/1998 | Reavey et al. | 345/173 |
| 5,886,424 A | | 3/1999 | Kim | |
| 5,926,364 A | * | 7/1999 | Karidis | 361/681 |
| 6,144,358 A | * | 11/2000 | Narayanaswamy et al. | 345/102 |
| 6,191,758 B1 | * | 2/2001 | Lee | 345/2 |
| 6,295,038 B1 | * | 9/2001 | Rebeske | 345/1 |

* cited by examiner

Primary Examiner—Richard Hjerpe
Assistant Examiner—Jennifer T. Nguyen
(74) Attorney, Agent, or Firm—Robert E. Bushnell, Esq.

(57) ABSTRACT

A portable computer includes a main LCD panel hingedly coupled to a system body, and an auxiliary LCD panel mounted upon the system body. A video image is identically displayed on both the main LCD panel and the auxiliary LCD panel. Alternatively, a definition of the auxiliary LCD panel is lower than that of the main LCD panel. Although a user cannot look at a screen of the main LCD panel, the user can confirm a position of a pointer through a screen of the auxiliary LCD panel. Therefore, the user can precisely control the pointer using a touch screen.

22 Claims, 11 Drawing Sheets

PORTABLE COMPUTER AND METHOD USING AN AUXILLIARY LCD PANEL HAVING A TOUCH SCREEN AS A POINTING DEVICE

CLAIM OF PRIORITY

This application makes reference to, incorporates the same herein, and claims all benefits accruing under 35 U.S.C. §119 from an application entitled PORTABLE COMPUTER HAVING POINTING DEVICE USING AUXILIARY LCD PANEL WITH TOUCH SCREEN earlier filed in the Korean Industrial Property Office on the 19$^{th}$ day of October 1999, and there duly assigned Ser. No. 99-45342.

BACKGROUND OF THE INVENTION

1. Field of the Invention

The present invention relates to a portable computer and, more particularly, a portable computer using an auxiliary liquid crystal display panel having a touch screen as a pointing

2. Description of the Related Art

At the present time, portable computers such as a notebook computer, a laptop computer, and a palmtop computer have been widely used in various business fields.

Referring to FIG. 1, a conventional portable computer 10 is shown. Portable computer 10 includes a liquid crystal display (LCD) panel 12 and a body 14. The LCD panel 12 is hingedly coupled to the body 14. A central processing unit (CPU), a memory device, a disk drive, etc. are arranged in the body 14. A keyboard device 16 and a pointing device 18 are mounted upon the body 14. Recently, most portable computers also have adopted a touch pad as a pointing device.

Considering free movement and use, a portable computer can be beneficial for business use. In this regard, for situations where a customer consults with a business representative in a face-to-face manner, portable computers considering such situations have been provided. A portable computer having a rotary LCD panel, for example, can be desirable for use in business fields where such frequent consultation occurs. FIG. 2 illustrates a portable computer 20 having a rotary LCD panel 22. Referring to FIG. 2, LCD panel 22 of portable computer 20 is rotatively coupled to a body 24. With the LCD panel 22 rotated in the direction indicated by the circular arrow A, a user can operate the portable computer 20 using a keyboard device 26 and a pointing device 28 which are mounted upon the body 24.

FIG. 3 illustrates an example of using a portable computer 20 having the rotary LCD panel 22 shown in FIG. 2. As shown in FIG. 3, a business representative 30 can rotate the rotary LCD panel 22 toward a customer 35 so that the customer 35 can easily look at the rotary LCD panel 22 in a face-to-face consultation. Since the business representative 30 can show data to the customer 35 through a screen of the rotary LCD panel 22, the consultation can be carried out efficiently. However, the business representative 30 can have difficulty in directly looking at the screen of the LCD panel 22. When the business representative 30 indicates a specific portion of the screen (e.g., click a specific icon) or selects a menu of an application program using a pointer, operation can be difficult. However, if the portable computer 20 were to have an auxiliary screen which enables the business representative 30 to confirm a position of the pointer displayed on the LCD panel 22, the above-mentioned problems can be overcome.

U.S. Pat. No. 5,637,871 to Piety, et al., entitled Portable Digital Infrared Thermography System, discloses an infrared thermography system that automates the collection, display, analysis, annotation, and recording of thernographic data and facilitates generation of reports. The system includes an infrared camera and a digital video data collector (VDC) having an embedded PC with an internal hard drive. The VDC also includes a VGA color LCD display with touch screen overlay for displaying images, for presenting information to a thermographer, and for receiving data and command inputs from the thermographer.

U.S. Pat. No. 5,801,793 to Faris, et al., entitled Backlighting Construction For Use In Computer-Based Display Systems Having Direct And Projection Viewing Modes Of Operation, discloses a reconfigurable backlighting construction for use in portable computer-based systems having direct and projection viewing modes of operation. The backlighting construction is integrated with an LCD display panel, a micropolarization panel, and a touch-screen writing panel to provide several different types of portable computer-based systems including, for example, a portable notebook computer, a computer-driven image display device, and a portable pen-computing device.

U.S. Pat. No. 5,828,427 to Faris, entitled Computer-Based Image Display Systems Having Direct And Projection Modes Of Viewing, discloses an electro-optical backlighting panel construction for use in portable computer-based systems having direct and projection viewing modes of operation. The electro-optical backlighting panel is integrated with an LCD display panel, a micropolarization panel, and a touch-screen writing panel to provide several different types of portable computer-based systems including, for example, a portable notebook computer, a computer-driven image display device, and a portable pen-computing device.

U.S. Pat. No. 5,837,968 to Rohrberg, et al., entitled Computer-Controlled Modular Power Supply For Precision Welding, discloses a computer controlled modular power supply for precision welding that includes an enclosure which holds a computer control module, a welding power module and an electrical power module. The computer control module includes a microprocessor which is programmed using a color LCD display with a touch screen mounted on one side of the enclosure.

U.S. Pat. No. 4,846,694 to Erhardt, entitled Computer Controlled, Overhead Projector Display, discloses an apparatus for demonstrating the use of a computer terminal that includes a projection module supported on a standard overhead projector. The projection module includes a frame which is adapted to rest on an illumination window of the overhead projector. A transmissive liquid crystal display is mounted in the frame parallel to the illumination window such that an image on the liquid crystal display is projected by the projector. A transparent touch screen is also mounted in the frame overlying the liquid crystal display. By means of a stylus, a user touches the touch screen and thereby designates desired text and/or images for subsequent display. Coupled to the decoder is a computer which retrieves the desired text and/or images which are then transmitted to a display driver.

U.S. Pat. No. 5,633,660 to Hansen, et al., entitled Integrated Touch Screen Input Device, discloses an integrated input device. The integrated input device includes a contact sensor capable of producing an analog signal indicative of the location of the position which is touched, an A/D converter capable of receiving the analog signal output from the contact sensor and converting it to a digital signal, a computer capable of receiving the digital signal output from the converter, interpreting the digital signal and transmitting a digitized video signal in response to the digital signal, a video connector capable of receiving the digitized video signal output from the computer, and a display which is capable of receiving the output from the video connector.

U.S. Pat. No. 5,886,424 to Kim, entitled Power Supply Apparatus For Portable Computer And DC Input Selection Circuit Adapted To The Same, discloses a power supply apparatus which permits a docking station to be operated with battery power from a battery pack of a portable computer even if supply of AC power to the docking station is accidentally cut off. The apparatus for a portable computer system for use with a docking station having a logic circuit for expanding functions of the portable computer includes a DC input selection circuit placed on the portable computer side for switching between the first and second DC voltages to provide a switched DC voltage to the portable computer, as well as the docking station, so that the docking station is operated with the second DC power source even though supply of AC power to the docking station is cut off.

SUMMARY OF THE INVENTION

It is therefore a feature, among other features, of the present invention to provide a portable computer having an auxiliary display device which can confirm a position of a pointer and control the pointer when a user is unable to look at a screen of an LCD panel of the portable computer.

According to one aspect of the invention, a portable computer includes a main LCD panel hingedly coupled to a system body, an auxiliary LCD panel mounted upon the system body, a first video controller for supplying video data to the main LCD panel, and a second video controller for supplying the video data to the auxiliary LCD panel, so that a video image is identically displayed on both the main LCD panel and the auxiliary LCD panel.

The portable computer includes a touch screen mounted upon the auxiliary LCD panel, and a touch screen interface for converting an input signal of the touch screen into a pointer input signal. The touch screen is used for controlling a pointer.

The main LCD panel is rotatively coupled to the system body. The portable computer includes a rotation sensor that senses rotation of the main LCD panel to generate a rotation sense signal, and a microcontroller that selectively controls an on state and an off state of the auxiliary LCD panel in response to the rotation sense signal. The auxiliary LCD panel has a back light, and a Direct Current/Alternating Current (DC/AC) inverter that inverts Direct Current (DC) power supplied from a power supply into Alternating Current (AC) power suitable for the back light and, thereafter, supplies the inverted version of the DC power to the back light.

The keyboard device of the portable computer has a specific function key that selectively controls an on state and an off state of the auxiliary LCD panel, and a microcontroller that selectively controls an on state and an off state of the LCD auxiliary panel when the specific function key on the keyboard device is actuated.

According to another aspect of the present invention, a portable computer includes a main LCD panel hingedly coupled to the system body, an auxiliary LCD panel mounted upon the system body, a video controller for supplying video data to the main LCD panel, and a definition converter for inputting the video data supplied from the video controller and converting the video data so as to have a definition suitable for the auxiliary LCD panel, so that a video image is identically displayed on both the main LCD panel and the auxiliary LCD panel.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Hereinbelow, preferred embodiments of the invention will now be explained more fully with reference to accompanying drawings.

In the present invention, a portable computer includes a main display panel, such as a main liquid crystal display (LCD) panel, for example, hingedly coupled to a body, and an auxiliary display panel, such as an auxiliary LCD panel, for example, mounted upon the body. The auxiliary LCD panel has a touch screen for controlling a pointer. A video image is identically displayed on both screens of the main LCD panel and the auxiliary LCD panel. Alternatively, a definition of the screen of the auxiliary LCD panel is lower than that of the main LCD panel. Therefore, if a user cannot look at the screen of the main LCD panel, the user can confirm a position of a pointer through the screen of the auxiliary LCD panel and precisely control the pointer using the touch screen.

Figure 1:
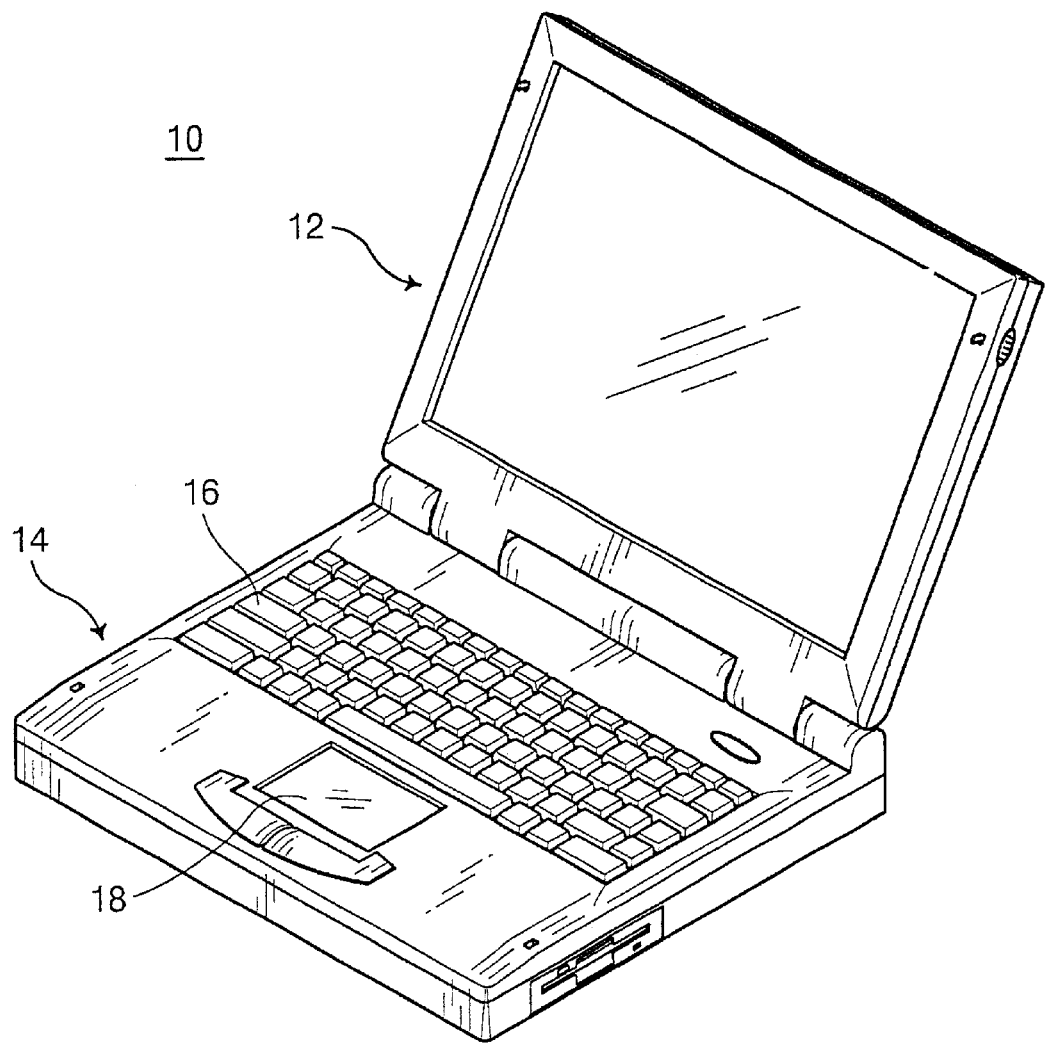
FIG. 1 is a perspective view illustrating a prior art portable computer.
Figure 2:
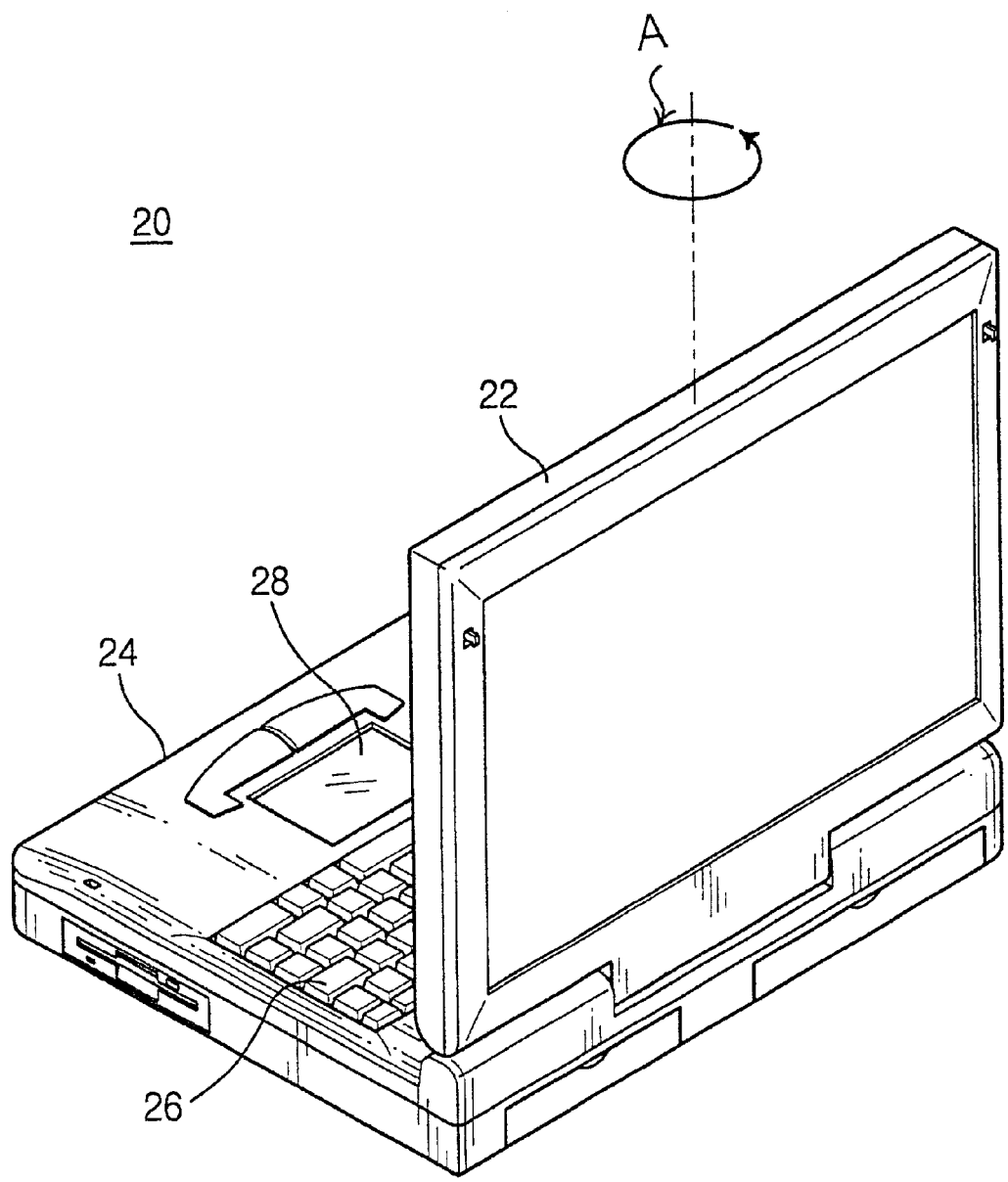
FIG. 2 is a perspective view illustrating a portable computer having a rotary LCD panel.
Figure 3:
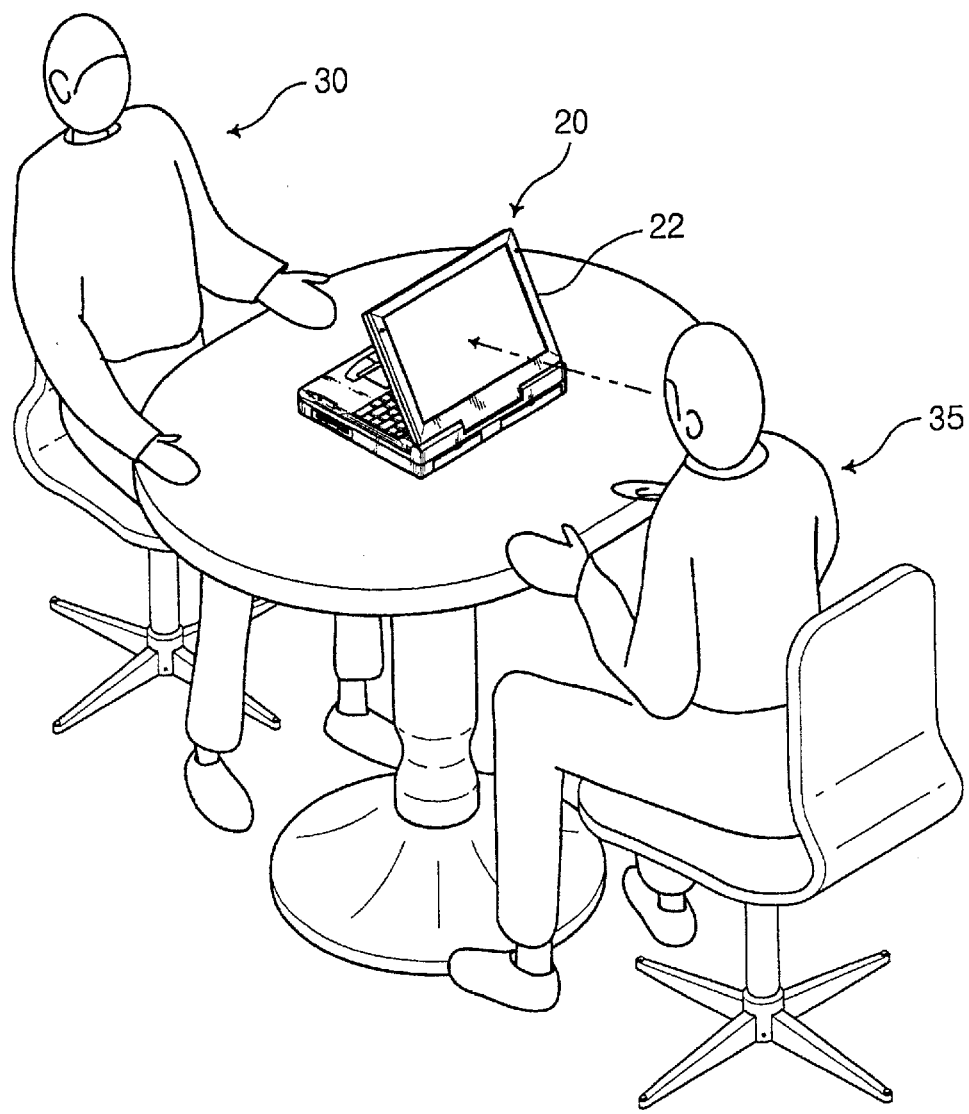
FIG. 3 is an exemplary view depicting use of the portable computer having a rotary LCD panel shown in FIG. 2.
Figure 4:
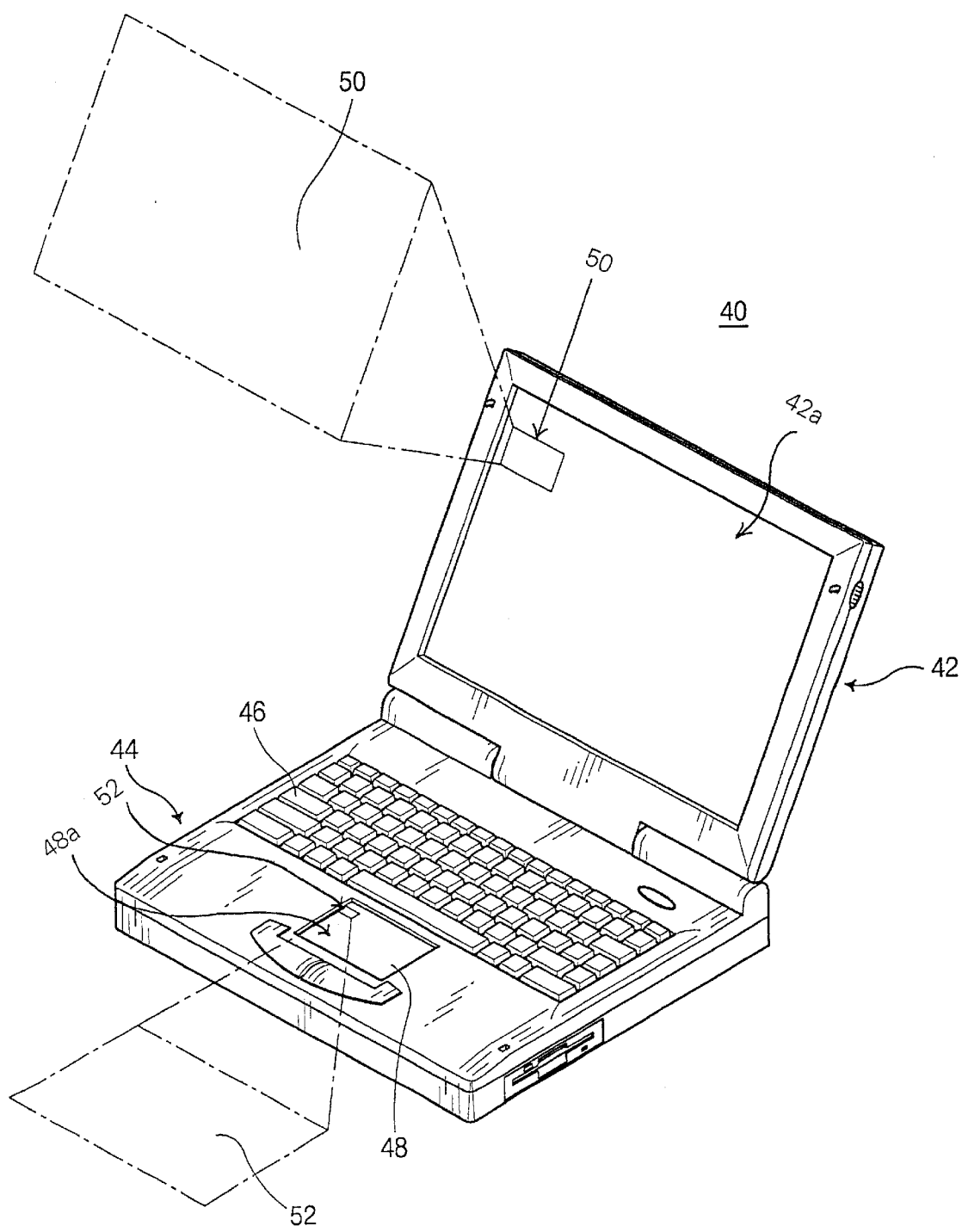
FIG. 4 is a perspective view illustrating a portable computer having an auxiliary LCD panel used as a pointing device in accordance with the present invention.

Referring now to FIG. 4, a portable computer 40 according to the present invention includes an LCD panel 42, hereafter referred to as the main LCD panel 42, and a body 44. The main LCD panel 42 is rotatively coupled to the body 44. A central processing unit (CPU), a memory device, a disk drive, etc. are mounted in the body 44. A keyboard device 46 and the auxiliary LCD panel 48 having a touch screen 48a are mounted upon the body 44. A video image is identically displayed on both screens 42a and 48a of the main LCD panel 42 and the auxiliary LCD panel 48. Alternatively, a definition of the auxiliary LCD panel 48 is lower than that of the main LCD panel 42. Pointers 50 and 52, which are identical to each other, are displayed on the main LCD panel 42 and the auxiliary LCD panel 48, respectively. Using the touch screen 48a of the auxiliary LCD panel 48, a user can carry out pointer input.

Figure 5:
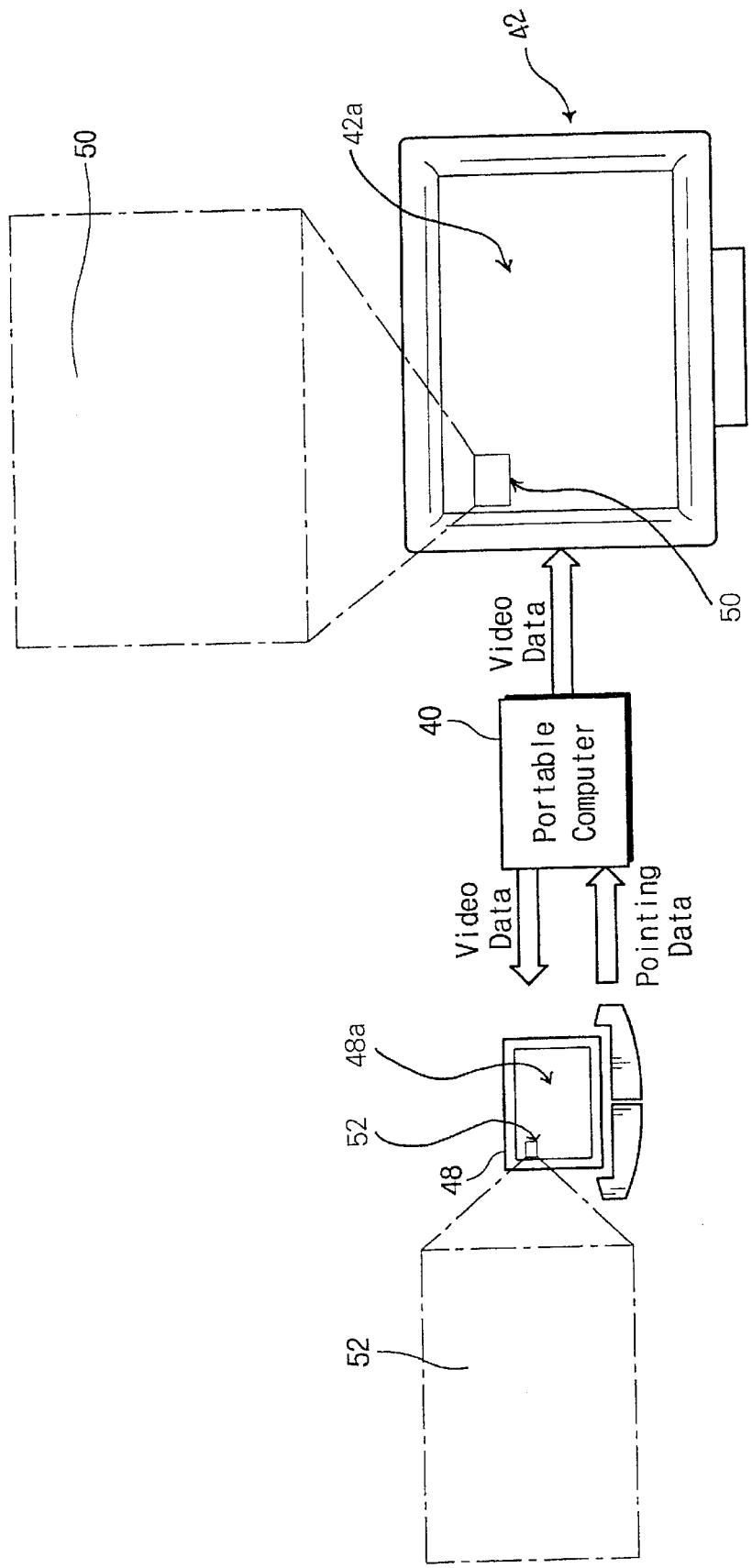
FIG. 5 illustrates a video image which is identically displayed on both a main LCD panel and an auxiliary LCD panel of the portable computer shown in FIG. 4.

Referring now to FIG. 5, video data generated from portable computer 40 are simultaneously input to both the main LCD panel 42 and the auxiliary LCD panel 48, so that a video image is identically displayed on the panels 42 and 48. Pointers 50 and 52, which are identical to each other, are displayed on screens 42a and 48a of the LCD panels 42 and 48, respectively. When a user cannot look at the screen of the main LCD panel 42, the user can confirm a position of the pointer by looking at the video image displayed on the auxiliary LCD panel 48 and carry out pointer input using the touch screen 48a of the auxiliary LCD panel 48.

Figure 6:
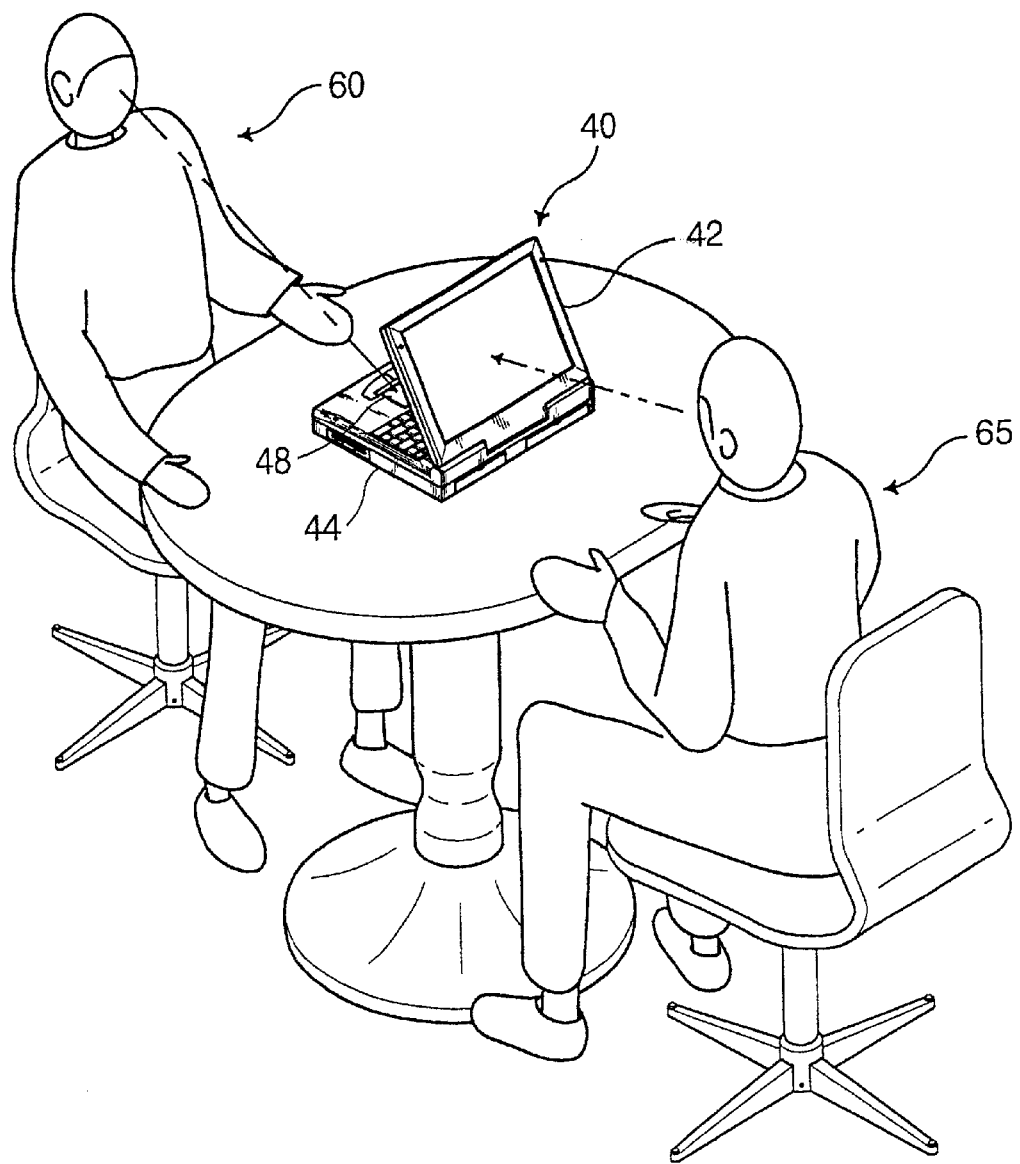
FIG. 6 is an exemplary view depicting use of the portable computer in accordance with the present invention.

In this regard, as shown in FIG. 6, with main LCD panel 42 turned toward a customer 65, a business representative or counselor 60 can display required data on the screen 42a of the main LCD panel 42, so that consultation can efficiently proceed. At this time, a video image displayed on the main LCD panel 42 is identically displayed on the auxiliary LCD panel 48. Since the business representative or counselor 60 can confirm a position of the pointer through the auxiliary LCD panel 48, it is possible to easily indicate a specific portion of the screen, click a specific ion, and select a menu of an application program.

Figure 7:
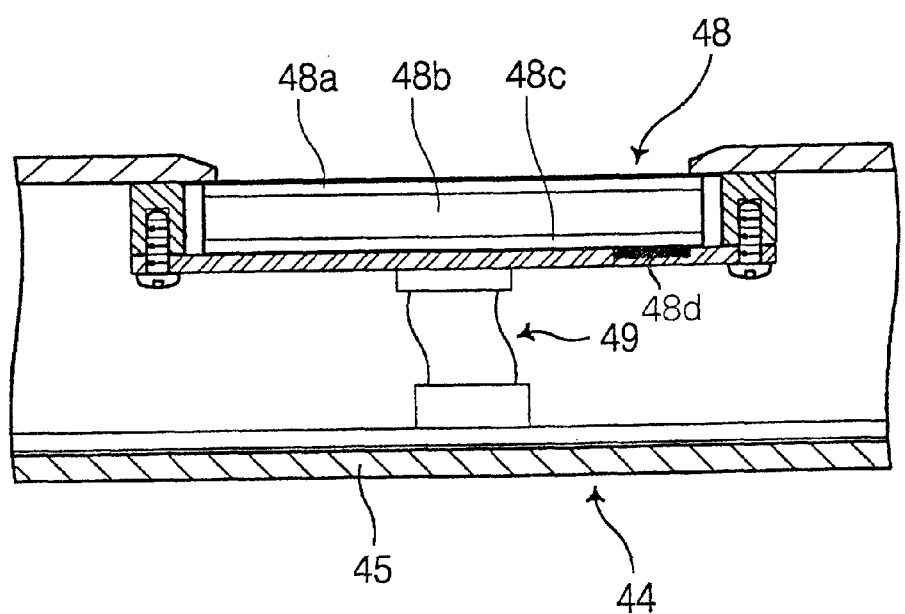
FIG. 7 is a cross-sectional view showing a structure of the auxiliary LCD panel having a touch screen shown in FIG. 4.

Referring now to FIG. 7, auxiliary LCD panel 48 is illustrated and includes the touch screen 48a, an LCD 48b, a back light 48c, and an LCD driver 48d. The LCD driver 48d is typically implemented on a printed circuit board contained in the LCD panel 48. The auxiliary LCD panel 48 is connected to a main board 45 of body 44 through a connection cable 49; and the auxiliary LCD panel 48 inputs and outputs video data and pointing information through the connection cable 49.

In general, a computer system includes a main system bus to which a central processing unit (i.e. Host) is connected. Thus, the main system bus is sometimes called a Host bus. An ISA (Industry Standard Architecture) bus was developed for use, such as in the IBM PC/XT and PC/AT computers. Starting in the early 90s, the ISA bus began to be replaced by the PCI (Peripheral Component Interconnect) bus architecture, such as that developed by Intel Corporation. Most modem personal computers (PCs) include both a PCI bus and an ISA expansion bus, as well as a Host bus. A bus bridge device couples two independent buses together. A bridge device typically has a primary bus interface and a secondary bus interface. Also, there are several types of bus bridges, such as Host bus to PCI bus (Host-to PCI) bridges, PCI bus to ISA expansion bus (PCI-to-ISA) bridges, PCI bus to PCI bus (PCI-to PCI) bridges, and PCI bus to CardBus (PCI-to CardBus) bridges.

Also, a Universal Serial Bus (USB) is typically used to support data transfer, such as data transfers at rates of 12 Mbps (12 million bits per second). In this regard, a single USB port can be used to connect up to 127 computer peripherals. Thus, the USB port is a USB interface that typically includes a USB controller and a USB connector. Further, a Basic Input Output System (BIOS) is built-in software in the computer system that determines what a computer can do without accessing programs from a disk. On PCs, the BIOS typically includes all of the code required to control the keyboard, display screen, disk drives, serial communications, and a number of miscellaneous functions. The BIOS is typically placed in a ROM (Read Only Memory) chip that is included with the computer and, thus, such a memory chip is often called a Basic Input Output System Read Only Memory (BIOS ROM).

Figure 8:
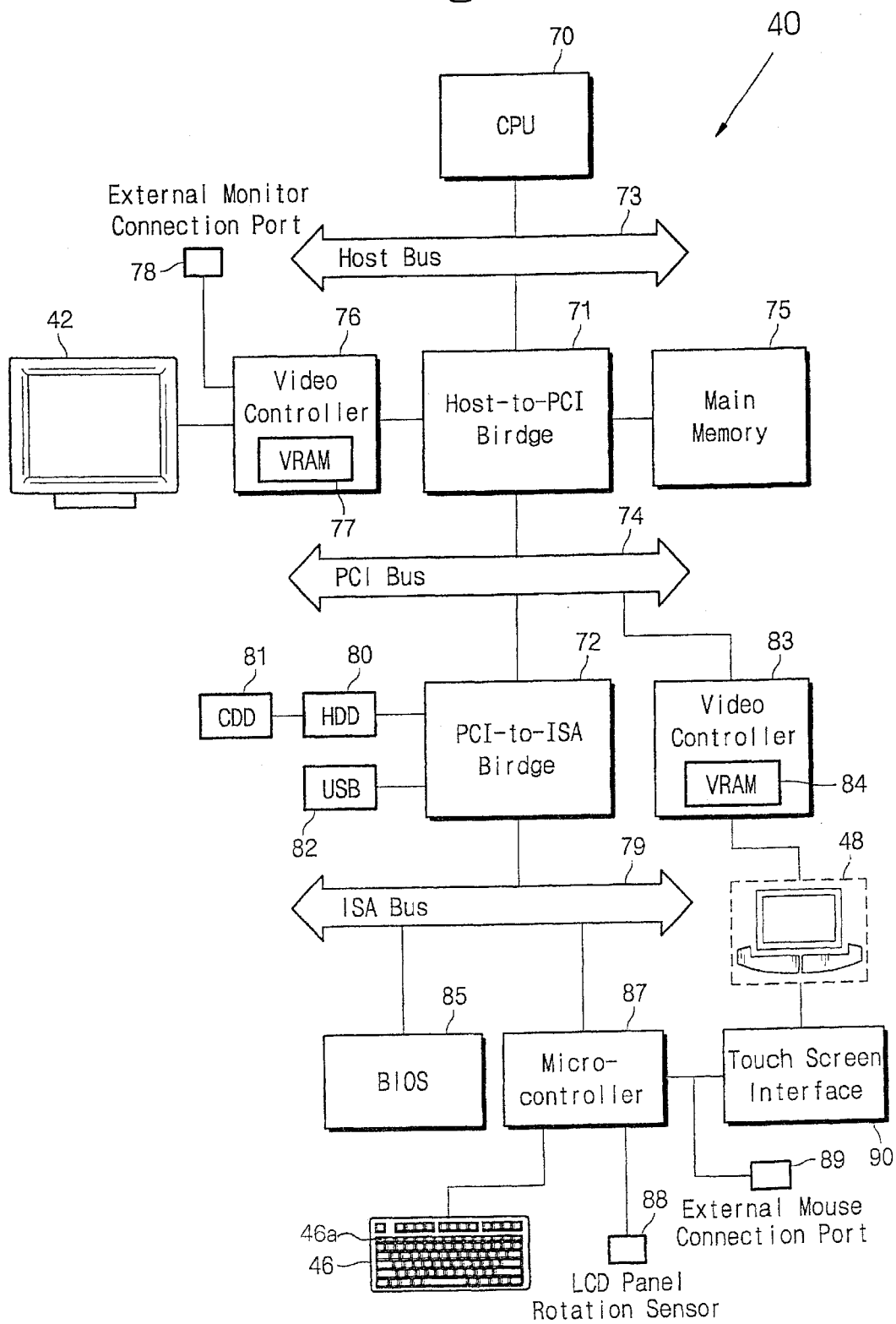
FIG. 8 is a block diagram showing a circuit structure of a portable computer in accordance with a first embodiment of the present invention.

Continuing now with reference to FIG. 8, a portable computer 40 of FIGS. 4 through 7 according to a first embodiment of the present invention is illustrated in FIG. 8. Portable computer 40 includes a central processing unit (CPU) 70, a Host-to-PCI bridge 71, and a PCI-to-ISA bridge 72. The CPU 70 is coupled to a Host bus 73, and the Host-to-PCI bridge 71 is coupled between Host bus 73 and a PCI bus 74. A first video controller 76 and a main memory 75 are coupled to the Host-to-PCI bridge 71. The first video controller 76 has a video memory 77, such as a video random access memory (VRAM), to which the main LCD panel 42 and an external monitor connection port 78 are coupled. The PCI-to-ISA bridge 72 is coupled between the PCI bus 74 and an ISA bus 79. A hard disk drive (HDD) 80, a compact disk-read only memory (CD-ROM) drive (CDD) 81, and a USB interface 82 are connected to the PCI-to-ISA bridge 72.

Continuing with reference to FIG. 8, a second video controller 83 having a video memory 84, such as a VRAM, is coupled to the PCI bus 74. Auxiliary LCD panel 48 is coupled to the second video controller 83. A BIOS ROM 85 and a microcontroller 87 are coupled to the ISA bus 79. Keyboard 46, an LCD panel rotation sensor 88, and an external mouse connection port 89 are coupled to the microcontroller 87. The microcontroller 87 is connected to the auxiliary LCD panel 48 through a touch screen interface 90. Through the identical port or different ports, the touch screen interface 90 and the external mouse connection port 89 are connected to the microcontroller 87.

The main LCD panel 42 receives video data from the first video controller 76, and displays a video image. The auxiliary LCD panel 48 receives video data from the second video controller 83, and displays a video image. A definition of the main LCD panel 42 can be identical to or higher than that of the auxiliary LCD panel 48. In the case of a lower definition, when a video image is identically displayed on the both LCD panels 42 and 48, the auxiliary LCD panel 48 should at least have definition which can confirm a position of a pointer. Conventionally, two methods have been used for displaying a video image through the auxiliary LCD panel 48. One is to display a video image with a definition lower than that of the main LCD panel 42. The other is to display a video image with the same definition as displayed on the main LCD panel 42, wherein the video image is partially displayed and a screen display region moves along the pointer.

The LCD panel rotation sensor 88 for sensing rotation of the main LCD panel 42 outputs a rotation sense signal when the LCD panel 42 is rotated. The touch screen interface 90 converts a touch screen input into a pointer input, and then supplies the pointer input to the microcontroller 87. The microcontroller 87 selectively controls the on and off states of the auxiliary LCD panel 48 in response to input processing of signals from the keyboard 88, input processing of the pointer signal through the touch screen interface 90, and input of the rotation sense signal. When the main LCD panel 42 is not rotated, the microcontroller 87 keeps the auxiliary LCD panel 48 in the off state. Therefore, the video image is not displayed on LCD panel 48, and the touch screen 48a is only enabled to achieve pointer input. When the main LCD panel 42 is rotated, auxiliary LCD panel 48 is powered on, and a video image displayed on the main LCD panel 42 is identically displayed on the auxiliary LCD panel 48. A specific function key 46a for selectively powering on and off the auxiliary panel 48 is located on the keyboard 46. Irrespective of the rotation state of the main LCD panel 42, the on and off states of the auxiliary LCD panel 48 can be controlled using the specific function key 46a.

Figure 9:
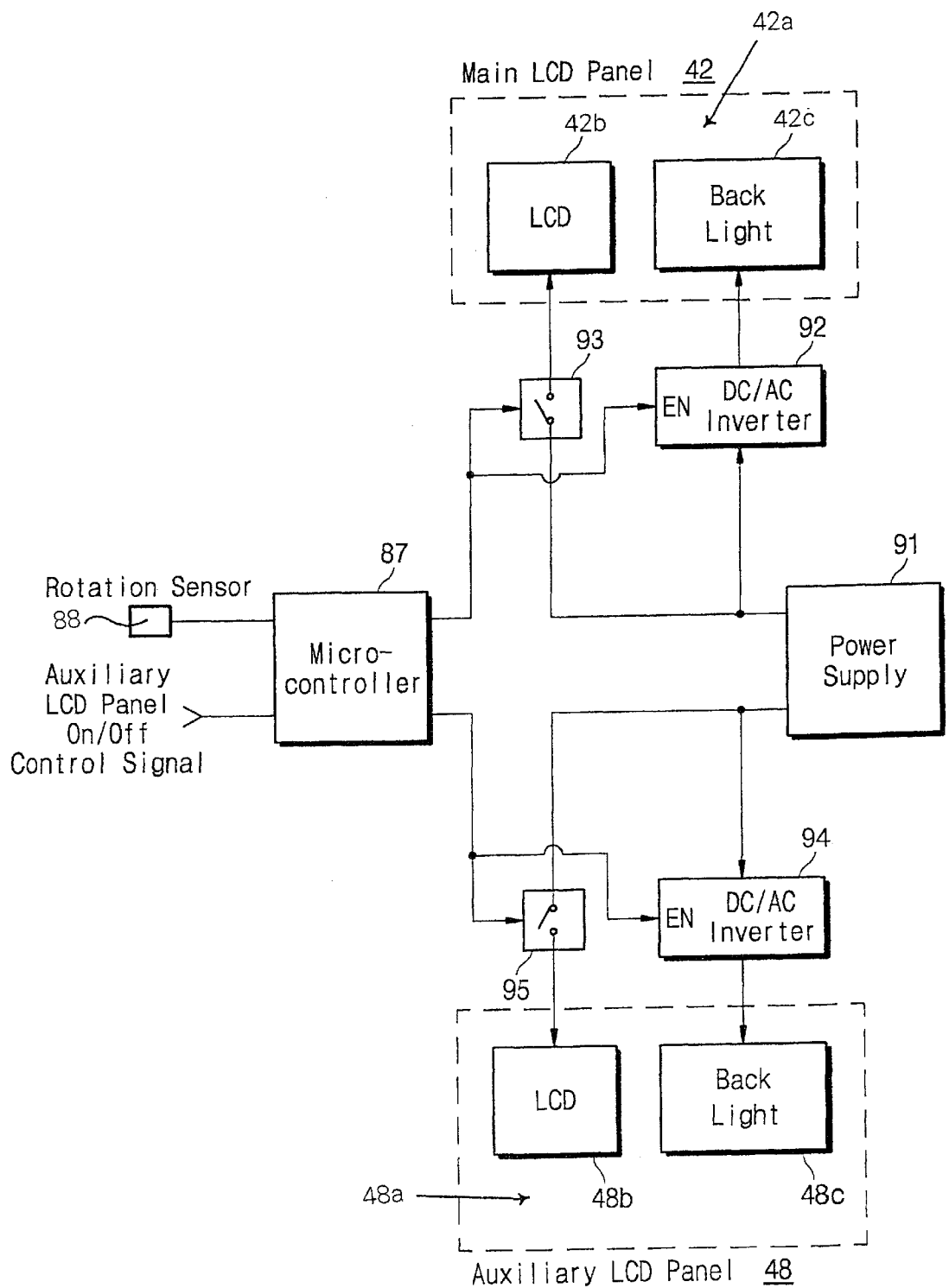
FIG. 9 illustrates a power supply hierarchy in relation to the auxiliary LCD panel of the portable computer in accordance with the present invention.

Referring now to FIG. 9, a power supply hierarchy in relation to the auxiliary LCD panel 48 of portable computer 40 of FIGS. 4 through 8 is illustrated in FIG. 9. In FIG. 9, a first switch 93 and a first DC/AC inverter 92 are respectively coupled between a power supply 91 and the main LCD panel 42. A second switch 95 and a second DC/AC inverter 94 are respectively coupled between the power supply 91 and the auxiliary LCD panel 48.

Continuing with reference to FIG. 9, the first switch 93 provides a current path for supplying LCD driving power from the power supply 91 to an LCD 42b for screen 42a of the main LCD panel 42. The first DC/AC inverter 92 inverts DC power supplied from the power supply 91 into AC power that is suitable for a back light 42c of the main LCD panel 42. The second switch 95 provides a current path for supplying LCD driving power to the LCD 48b of the auxiliary LCD panel 48. The second DC/AC inverter 94 inverts DC power supplied from the power supply 91 into AC power that is suitable for the back light 48c of the auxiliary LCD panel 48. A microcontroller 87 selectively powers on and off the second switch 95 and the first switch 93, and also selectively enables and disables control of the second DC/AC inverter 94 in response to an input of a rotation sense signal from the rotation sensor 88 or in response to input of a specific function key of a keyboard 46, such as specific function key 46a, for selective on and off control of the auxiliary LCD panel 48.

Figure 10:
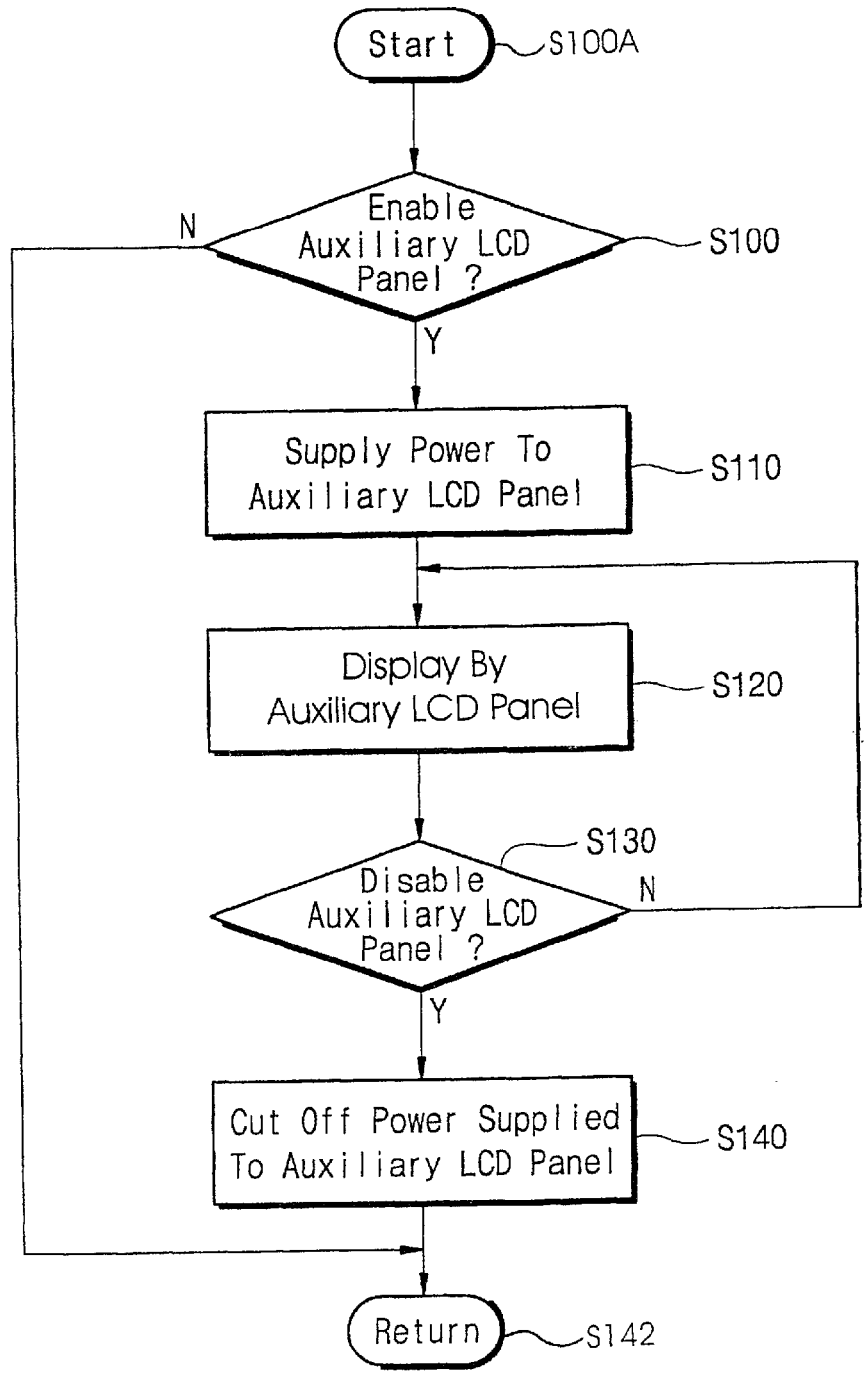
FIG. 10 is a flowchart illustrating the steps of power supply control of the auxiliary LCD panel by a microcontroller shown in FIG. 8 in accordance with the present invention.

FIG. 10 is a flowchart illustrating the steps of a method for power supply control of the auxiliary LCD panel 48 by the microcontroller 87 of FIGS. 8 and 9. Referring now to FIG. 10, the process begins at step S100A and proceeds to step S100. In step S100, microcontroller 87 determines whether to enable the auxiliary LCD panel 48. That is, the microcontroller 87 checks whether a rotation sense signal is input from rotation sensor 88 according to rotation of the main LCD panel 42, or whether there is an input from the specific function key 46a of keyboard 46. If the auxiliary LCD panel 48 is enabled, the process proceeds from step S100 to step S100 whereby power is supplied to the auxiliary LCD panel 48. Otherwise, the process proceeds to step S142 and returns to await enablement of the auxiliary LCD panel 48. From step S110 the method proceeds to step S120. In step S120, a display is performed by the auxiliary LCD panel 48. The method then proceeds to step S130. In step S130, the microcontroller 87 determines whether to disable the auxiliary LCD panel 48. That is, the microcontroller 87 determines whether the rotation sense signal from rotation sensor 88 is not input or indicates a normal position of the main LCD panel 42, or whether a specific function key of the keyboard 46 is input, such as receiving a corresponding input from specific function key 46a for disabling the auxiliary LCD panel 48. If the auxiliary LCD panel 48 is disabled, the method proceeds from step S130 to step S140, whereby power supplied to the auxiliary LCD panel 48 is cut off, and the method then proceeds to step S142 and returns to again await enabling of the auxiliary LCD panel 48. Otherwise, the method proceeds from step S130 to S120 to continue the display performed by the auxiliary LCD panel 48.

Figure 11:
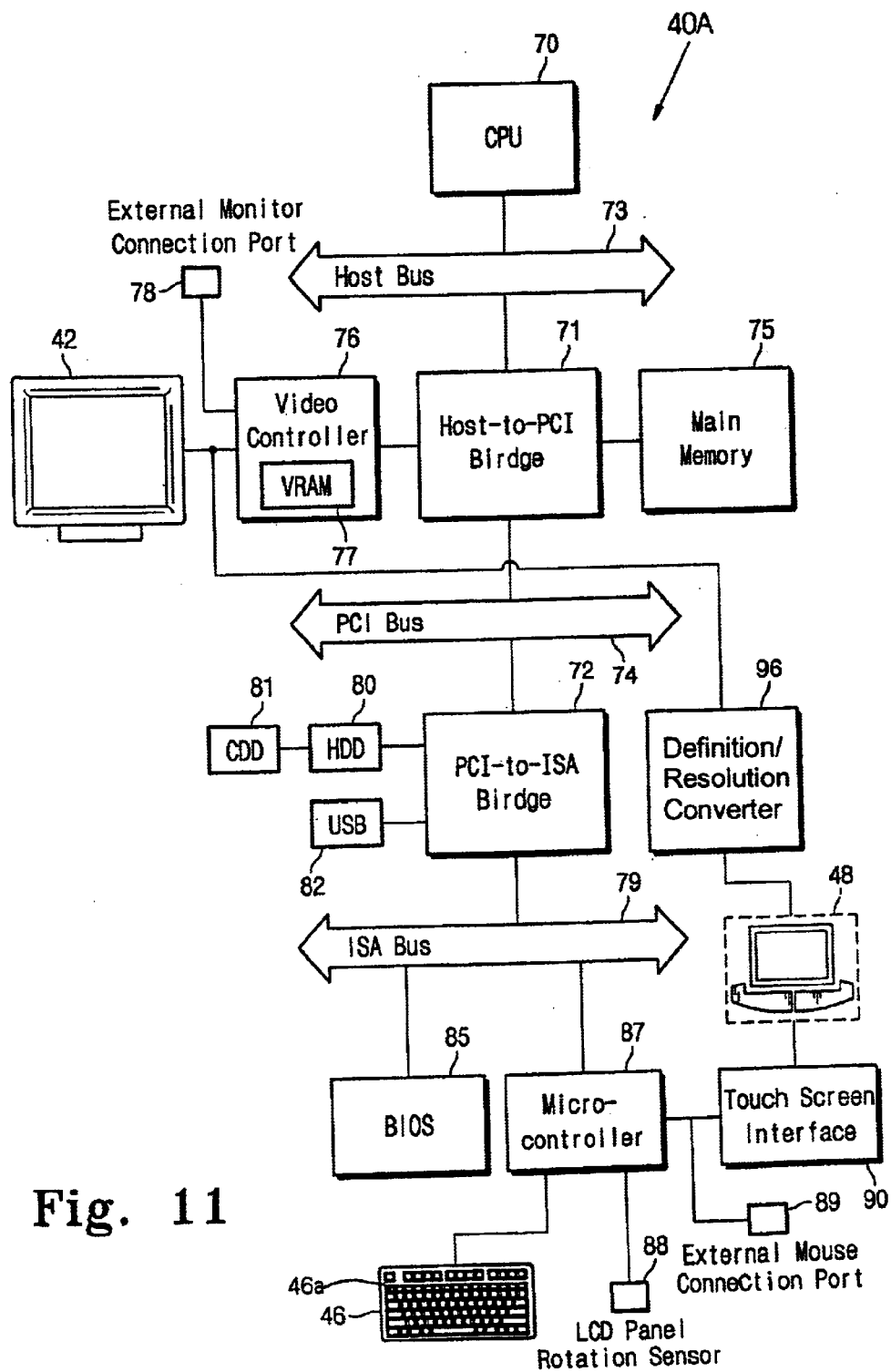
FIG. 11 is a block diagram illustrating a circuit structure of a portable computer in accordance with a second embodiment of the present invention.

Referring now to FIG. 11, a circuit structure of a portable computer according to a second embodiment of the present invention is shown. In FIG. 11, portable computer 40A is similar in structure to portable computer 40 of FIGS. 4 through 8, but portable computer 40A has a definition converter or resolution converter 96 for the auxiliary LCD panel 48. The definition or resolution converter 96 is located between the video controller 76 and the auxiliary LCD panel 48. Video data output from the video controller 76 is converted to match a definition of the auxiliary LCD panel 48 by the definition converter 96, the definition converter 96 supplying the video data from the video controller 76 to the auxiliary LCD panel 48. Such definition converting technique as applied in the present invention in portable computer 40A is well known in the art.

As described previously, in the present invention, if the main LCD panel 42 is rotated so that the screen of the main LCD panel 42 does not face a user, the user can confirm a position of a pointer through the screen of the auxiliary LCD panel 48. Moreover, a user can precisely control the pointer using a touch screen of the auxiliary LCD panel 48.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention include all embodiments falling within the scope of the appended claims.

What is claimed is:

1. A portable computer, comprising:
   a system body;
   a main display panel hingedly coupled to the system body;
   an auxiliary display panel positioned on the system body;
   a first video controller for supplying video data to the main display panel; and
   a second video controller for supplying video data to the auxiliary display panel;
   whereby a video image is identically displayed on both the main display panel and the auxiliary display panel;
   wherein the auxiliary display panel includes a touch screen and a touch screen interface for converting an input signal of the touch screen into a pointer input signal, whereby the touch screen is used for controlling a pointer of the portable computer.

2. The portable computer of claim 1, wherein the main display panel is rotatively coupled to the system body.

3. A portable computer, comprising:
   a system body;
   a main display panel hingedly coupled to the system body;
   an auxiliary display panel positioned on the system body;
   a first video controller for supplying video data to the main display panel; and a second video controller for supplying video data to the auxiliary display panel;

whereby a video image is identically displayed on both the main display panel and the auxiliary display panel;

wherein the main display panel is rotatively coupled to the system body, said system further comprising:

a rotation sensor for sensing rotation of the main display panel to generate a rotation sense signal; and a microcontroller for selectively controlling an on state and an off state of the auxiliary display panel in response to the rotation sense signal.

4. The portable computer of claim 3, the auxiliary display panel having a back light and a direct current to alternating current converter for converting direct current power supplied from a power supply into alternating current power for driving of the back light, and for supplying the alternating current power to the back light.

5. The portable computer of claim 3, further comprising:

a keyboard device, including a specific function key for selectively controlling the on state and the off state of the auxiliary display panel; and a microcontroller for selectively controlling the on state and the off state of the auxiliary display panel when the specific function key is activated by a user.

6. The portable computer of claim 3, the auxiliary display panel including a touch screen and a touch screen interface for converting an input signal of the touch screen into a pointer input signal, whereby the touch screen is used for controlling a pointer of the portable computer.

7. A portable computer, comprising:

a system body;

a main display panel hingedly coupled to the system body;

an auxiliary display panel positioned on the system body;

a first video controller for supplying video data to the main display panel; and a second video controller for supplying video data to the auxiliary display panel;

whereby a video image is identically displayed on both the main display panel and the auxiliary display panel;

said system further comprising:

a keyboard device, including a specific function key for selectively controlling an on state and an off state of the auxiliary display panel; and a microcontroller for selectively controlling the on state and the off state of the auxiliary display panel when the specific function key is activated by a user.

8. The portable computer of claim 7, the auxiliary display panel including a touch screen and a touch screen interface for converting an input signal of the touch screen into a pointer input signal, whereby the touch screen is used for controlling a pointer of the portable computer.

9. A portable computer, comprising:

a system body;

a main display panel hingedly coupled to the system body;

an auxiliary display panel positioned on the system body, the auxiliary display panel including a touch screen and a touch screen interface for converting an input signal of the touch screen into a pointer input signal, the touch screen being usable for identically controlling pointers displayed on both the main display panel and the auxiliary display panel of the portable computer;

a video controller for supplying video data to the main display panel; and a definition converter connected between the video controller and the auxiliary display panel for inputting the video data supplied by the video controller to the auxiliary display panel, and for converting the video data so as to have a definition suitable for the auxiliary display panel to enable a video image displayed on the main display panel to also be displayed on the auxiliary display panel.

10. The portable computer of claim 9, the main display panel being rotatively coupled to the system body.

11. The portable computer of claim 10 further comprising:

a rotation sensor for sensing rotation of the main display panel to generate a rotation sense signal; and a microcontroller for selectively controlling an on state and an off state of the auxiliary display panel in response to the rotation sense signal.

12. The portable computer of claim 11, further comprising:

a keyboard device, including a specific function key for selectively controlling the on state and the off state of the auxiliary display panel; and a microcontroller for selectively controlling the on state and the off state of the auxiliary display panel when the specific function key is actuated by a user.

13. The portable computer of claim 12, the auxiliary display panel being positioned adjacent to said keyboard device, said keyboard device being positioned on the system body of the portable computer.

14. The portable computer of claim 9, the auxiliary display panel having a back light and a direct current to alternating current converter for converting direct current power supplied from a power supply into alternating current power for driving of the back light, and for supplying the alternating current power to the back light.

15. The portable computer of claim 9, further comprising:

a keyboard device, including a specific function key for selectively controlling an on state and an off state of the auxiliary display panel; and a microcontroller for selectively controlling the on state and the off state of the auxiliary display panel when the specific function key is actuated by a user.

16. The portable computer of claim 15, the auxiliary display panel being positioned adjacent to said keyboard device, said keyboard device being positioned on the system body of the portable computer.

17. A method of using a touch screen in a portable computer, comprising the steps of:

supplying video data from a first video controller to a main display panel of a portable computer;

supplying video data from a second video controller to an auxiliary display panel of the portable computer; and identically displaying a video image on both the main display panel and the auxiliary display panel in correspondence to the video data supplied to the main display panel and the video data supplied to the auxiliary display panel;

said method further comprising the step of selectively controlling an on state and an off state of the auxiliary display panel in response to a rotation sense signal from a rotation sensor upon sensing a rotation of the main display panel.

18. A method of using a touch screen in a portable computer, comprising the steps of:

supplying video data from a first video controller to a main display panel of a portable computer;

supplying video data from a second video controller to an auxiliary display panel of the portable computer; and identically displaying a video image on both the main display panel and the auxiliary display panel in correspondence to the video data supplied to the main display panel and the video data supplied to the auxiliary display panel;

said method further comprising the step of selectively controlling an on state and an off state of the auxiliary display panel by a specific function key of a keyboard of the portable computer.

19. A method of using a touch screen in a portable computer, comprising the steps of:

supplying video data from a first video controller to a main display panel of a portable computer;

supplying video data from a second video controller to an auxiliary display panel of the portable computer; and identically displaying a video image on both the main display panel and the auxiliary display panel in correspondence to the video data supplied to the main display panel and the video data supplied to the auxiliary display panel;

said method further comprising the step of converting an input signal of a touch screen of the auxiliary display panel into a pointer input signal for controlling a pointer for the portable computer.

20. A method of using a touch screen in a portable computer which includes a main display panel and an auxiliary display panel, comprising the steps of:

supplying video data from a video controller to the main display panel of the portable computer to display a video image on the main display panel;

converting, by a definition converter, the video data supplied from the video controller to have a definition suitable for the auxiliary display panel of the portable computer; and supplying the video data from the definition converter to the auxiliary display panel to display the video image displayed on the main display panel on the auxiliary display panel in correspondence to the video data; and converting an input signal of a touch screen of the auxiliary display panel into a pointer input signal for identically controlling pointers displayed on both the main display panel and the auxiliary display panel.

21. The method of claim 20, further comprising the step of selectively controlling an on state and an off state of the auxiliary display panel in response to a rotation sense signal from a rotation sensor upon sensing a rotation of the main display panel.

22. The method of claim 20, further comprising the step of selectively controlling an on state and an off state of the auxiliary display panel in response to activation, by a user, of a specific function key of a keyboard of the portable computer.

* * * * *